United States Patent
Canbekte

(10) Patent No.: US 9,506,128 B2
(45) Date of Patent: Nov. 29, 2016

(54) METHOD FOR LEACHING NICKEL, COBALT AND IRON FROM A NICKEL LATERITE ORE

(71) Applicant: Husnu Sinan Canbekte, Istanbul (TR)

(72) Inventor: Zekeriya Canbekte, Istanbul (TR)

(*) Notice: Subject to any disclaimer, the term of this patent is extended or adjusted under 35 U.S.C. 154(b) by 0 days.

(21) Appl. No.: 14/425,940

(22) PCT Filed: Sep. 3, 2013

(86) PCT No.: PCT/EP2013/068160
§ 371 (c)(1),
(2) Date: Mar. 4, 2015

(87) PCT Pub. No.: WO2014/037336
PCT Pub. Date: Mar. 13, 2014

(65) Prior Publication Data
US 2015/0218669 A1 Aug. 6, 2015

(30) Foreign Application Priority Data
Sep. 4, 2012 (EP) .................................... 12182922

(51) Int. Cl.
C22B 3/08 (2006.01)
C22B 3/00 (2006.01)
C21B 15/00 (2006.01)

(52) U.S. Cl.
CPC ............... C22B 3/08 (2013.01); C21B 15/00 (2013.01); C22B 23/043 (2013.01)

(58) Field of Classification Search
None
See application file for complete search history.

(56) References Cited

U.S. PATENT DOCUMENTS 3,821,354 A * 6/1974 Gandon et al. ............... 423/139
5,320,665 A 6/1994 Mullins

FOREIGN PATENT DOCUMENTS

WO 2005008548 1/2005

OTHER PUBLICATIONS

McDonald, et al., "Atmostpheric Acid Leaching of Nickel Laterites Review", Hydrometallurgy, Elsevier Scientific Publishing CY, Amsterdam, NL, vol. 91, No. 1-4, Nov. 28, 2007, pp. 35-55, XP022524528, ISSN: 0304-386X.

Gladyshev, et al., "Processing of Sulphide Concentrates—by Treating Them with Sulphuric Acid Contg. Urea! and Leaching with Water", WPI/Thomson, vol. 1984, No. 8, Apr. 7, 1983, XP002685665.

Krzystof, et al., "Recovery of Vanadium, Potassium and Iron from a Spent Catalyst Using Urea Solution", Hydrometallurgy, Elsevier Scientific Publishing, CY, Amsterdam, NL, vol. 103, No. 1-4, Jun. 1, 2010, pp. 19-24, XP002685656.

* cited by examiner

*Primary Examiner* — Melissa Swain
(74) *Attorney, Agent, or Firm* — Volpe and Koenig, P.C.

(57) ABSTRACT

We propose a method for leaching nickel, cobalt and iron from a nickel laterite ore, characterized in that the nickel laterite ore is brought into contact with a solution of sulphuric acid and urea mixture. In this way, there is provided a method for efficient recovery of nickel and cobalt from nickel laterite ores where leaching in sulphuric acid/urea mixture can be completed in about less than 1 hour.

7 Claims, No Drawings

METHOD FOR LEACHING NICKEL, COBALT AND IRON FROM A NICKEL LATERITE ORE

TECHNICAL FIELD OF THE INVENTION

The present invention relates to a process for the leaching of nickel laterite ores in a mixture of sulphuric acid and urea solution.

BACKGROUND OF THE INVENTION

Leaching of nickel laterites, or in in general of metal laterite ores, with sulphuric acid is a widely applied process. Normally, these processes are either carried out in tanks at elevated temperatures of 85-90° C. for periods of up to 22 hours or in pressure autoclaves under high pressures above 40 atm and temperatures around 250° C. In some cases, nickel containing materials are subjected to heap leaching for periods up to 18 months.

The article 'Recovery of vanadium, potassium and iron from a spent catalyst using urea solution" by Mazurek K, Bialowicz K. Trypuć M.; Hydrometallurgy 103 (1-4), pp. 19-24, 2010' describes a method for leaching of metals (vanadium, iron and potassium) using a mixture of sulphuric acid and urea.

U.S. Pat. No. 5,320,665 describes a process for recovery of, particularly, noble metals by leaching the ore with a solution of sulphuric acid and thiourea.

Document WO 200508548 describes a process wherein all types of metal including precious metals can be leached or dissolved from different metal containing materials such as soil and crushed rock by exposing the material to a combination of three different chemicals of a metal leachant which preferably comprises urea, a pH adjuster, preferably hydrolic acid, sulphuric acid or sodium sulphate, to lower the pH to a value below 3,5, and an oxidizer, preferably ferric chloride, at low temperatures.

Numerous patents and processes are available to explain leaching of metals with sulphuric acid. However, in most of these processes, leaching time is normally rather long for high metal recoveries leading to higher capital and operating expenses.

SUMMARY

The object of the invention is to provide a method for efficient recovery of nickel and cobalt from nickel laterite ores where leaching in sulphuric acid/urea mixture is completed in about less than 1 hour.

The object is achieved by means of a method comprising the features of the invention. Preferred further embodiments of the invention are defined below and in the claims.

During the work leading to the present invention it was found possible to leach or dissolve nickel and cobalt from different nickel containing materials such as ores, residues and concentrates within less than 2 hours by exposing the material to a mix solution of sulphuric acid and urea. After about half an hour to two hours of leaching, metal recoveries went up to 98%. The amount of urea used can be as low as 0.5% of the feed material. The urea in the solution is believed to attack iron in metal containing materials and thus releases other metals which become soluble in sulphuric acid in a short time.

The leachate solution containing dissolved metals is further treated to recover iron, and the remaining solution, in which an acid concentration rises, can either be returned to the leaching or can be processed further to recover nickel and cobalt.

The advantages with the method according to the invention is that the method can—in preferred embodiments thereof—be performed at atmospheric pressure and at temperatures varying from ambient to boiling levels. Furthermore, no gases are emitted and due to very short leaching time of preferably under 2 hours simple and inexpensive equipment can be used to perform the method.

Thus, the present invention relates to a process for efficient leaching of nickel laterite ores.

Additional features of the invention will be evident from the following description and the appended claims.

DETAILED DESCRIPTION OF THE INVENTION

The present invention relates to a process for efficiently dissolving metals from nickel bearing materials, which are, for example, nickel containing wastes and residues, ores and concentrates from mining operations and from processing of ores. The purpose for dissolving the metals from the nickel containing materials is the extraction of metals and their compounds for marketing reasons.

The term 'metal' used herein and in the appended claims encompass nickel, cobalt and any other metals that are normally soluble in sulphuric acid and which are associated with iron in a laterite bond.

Not all of steps a) through c) as detailed below must be realized in a method according to the invention but may be combined freely in a particular embodiment thereof.

a) When nickel laterite ores are subjected to a dilute sulphuric acid solution, metals are dissolved. Addition of urea to the sulphuric acid solution in sufficient amounts increases the dissolution rate and hence the leaching is completed within between half an hour to two hours. During the leaching, the temperature can be 80-95° C. and the slurry can be continuously agitated.

b) Following the separation of residue by conventional methods, i.e. thickening and/or filtration, the residue, which contains mainly silica with or without gypsum, is discarded while the solution is treated further to recover iron.

c) Nickel and cobalt in the leach solution can either be recovered by resins at this stage, after which the solution goes to iron recovery, or the leach solution can be treated directly for iron recovery with nickel and cobalt recovery to follow afterwards.

Practically, the method can be performed in vessels made from stainless steels or mild steel or concrete tanks, which can be lined with acid resistant bricks.

The leaching time is relatively short compared with other leaching techniques. Normally, the time required is from about half an hour to two hours in some cases.

The invention will now be further explained in the following examples. These examples are only intended to illustrate the invention and should in no way be considered to limit the scope of the invention.

EXAMPLE

The method and the solution according to the invention was used to leach metals from a nickel laterite ore. 100 g of a nickel laterite ore sample ground to 74 microns was subjected to sulphuric acid and urea leaching. The original sample was analyzed by Atomic Absorption AAS. The leaching was conducted in one step for 1 hour at atmospheric pressure at elevated temperature of 90° C. The solid to liquid ratio was 3 and acid strength was about 200 g/l. After leaching, the residue analysis was performed. The ratio of residue to the original sample was 34,18%.

TABLE

Analysis of ore sample and leach residue

| Parameter | Nickel Ore AAS (%) | Leach residue AAS (%) |
|---|---|---|
| Fe | 23.28 | 0.99 |
| Ni | 0.98 | 0.017 |
| Co | 0.05 | 0.002 |

The recoveries are calculated as follows: Fe recovery: 98,55%, Ni Recovery: 99,42%, Co Recovery: 98,65%. These results indicate that sulfuric acid/urea leaching for 1 hour is successful for recovering Nickel, Cobalt and iron.

The invention claimed is:

1. A method for leaching nickel, cobalt and iron from a nickel laterite ore, comprising bringing the nickel laterite ore into contact with a solution of sulphuric acid and urea mixture.

2. The method according to claim 1, further comprising performing leaching during a time period between half an hour and two hours.

3. The method according to claim 1, wherein an amount of urea used is less than 1.0 weight % of feed material.

4. The method according to claim 1, wherein leaching is carried out at a leaching temperature of 60-95° C. at atmospheric pressure.

5. The method according to claim 1, further comprising performing leaching at atmospheric pressure.

6. The method according to claim 1, further comprising finely dividing the ore.

7. The method according to claim 6, wherein the nickel laterite ore is ground to 100 microns or less.

* * * * *